United States Patent [19]
Kubo et al.

[11] Patent Number: 5,875,556
[45] Date of Patent: Mar. 2, 1999

[54] APPARATUS AND METHOD FOR MEASURING A FIGURE

[75] Inventors: Akio Kubo, 12-7, 2-chome Chidori, Ota-ku, Tokyo; Hiroshi Naoi; Hiroshi Nemoto, both of Tokyo, all of Japan

[73] Assignee: Akio Kubo

[21] Appl. No.: 758,522

[22] Filed: Nov. 29, 1996

[30] Foreign Application Priority Data

Dec. 7, 1995 [JP] Japan ................................. 7-318833

[51] Int. Cl.⁶ .............................. G01B 5/26; G01B 7/32
[52] U.S. Cl. ................................. 33/123; 33/773; 33/124
[58] Field of Search ........................ 33/123, 1 M, 1 CC, 33/772, 773, 449, 121, 122, 124

[56] References Cited

U.S. PATENT DOCUMENTS

| | | | |
|---|---|---|---|
| 4,616,419 | 10/1986 | Kubo | 33/122 |
| 4,617,740 | 10/1986 | Mikio | 33/122 |
| 5,038,484 | 8/1991 | Rench et al. | 33/124 |
| 5,115,569 | 5/1992 | Kubo | 33/1 M |
| 5,515,299 | 5/1996 | Kaji et al. | 33/121 |
| 5,708,592 | 1/1998 | Kaji | 33/123 |
| 5,727,329 | 3/1998 | Kubo | 33/773 |

FOREIGN PATENT DOCUMENTS

| | | |
|---|---|---|
| 4208013 | 6/1980 | Japan . |
| 55-37682 | 9/1980 | Japan . |
| 62-119407 | 5/1987 | Japan . |
| 531721 | 5/1993 | Japan . |
| 7167606 | 7/1995 | Japan . |

*Primary Examiner*—Christopher W. Fulton
*Attorney, Agent, or Firm*—Greenblum & Bernstein, P.L.C.

[57] ABSTRACT

A measuring device, such as a planimeter, having an increased measurable range for measuring a figure without increasing a length of the measuring device. The measurable range of a planimeter is based upon the a physical length of the planimeter. In order to increase the measurable range of the planimeter, the planimeter is provided with an operation control switch that functions to set a measurement mode of a computer associated with the planimeter to a suspend mode, temporarily halting a measurement operation, so that the planimeter can be shifted to another position. Thus, the measuring range of the planimeter is increased without increasing the physical length of the planimeter.

20 Claims, 10 Drawing Sheets

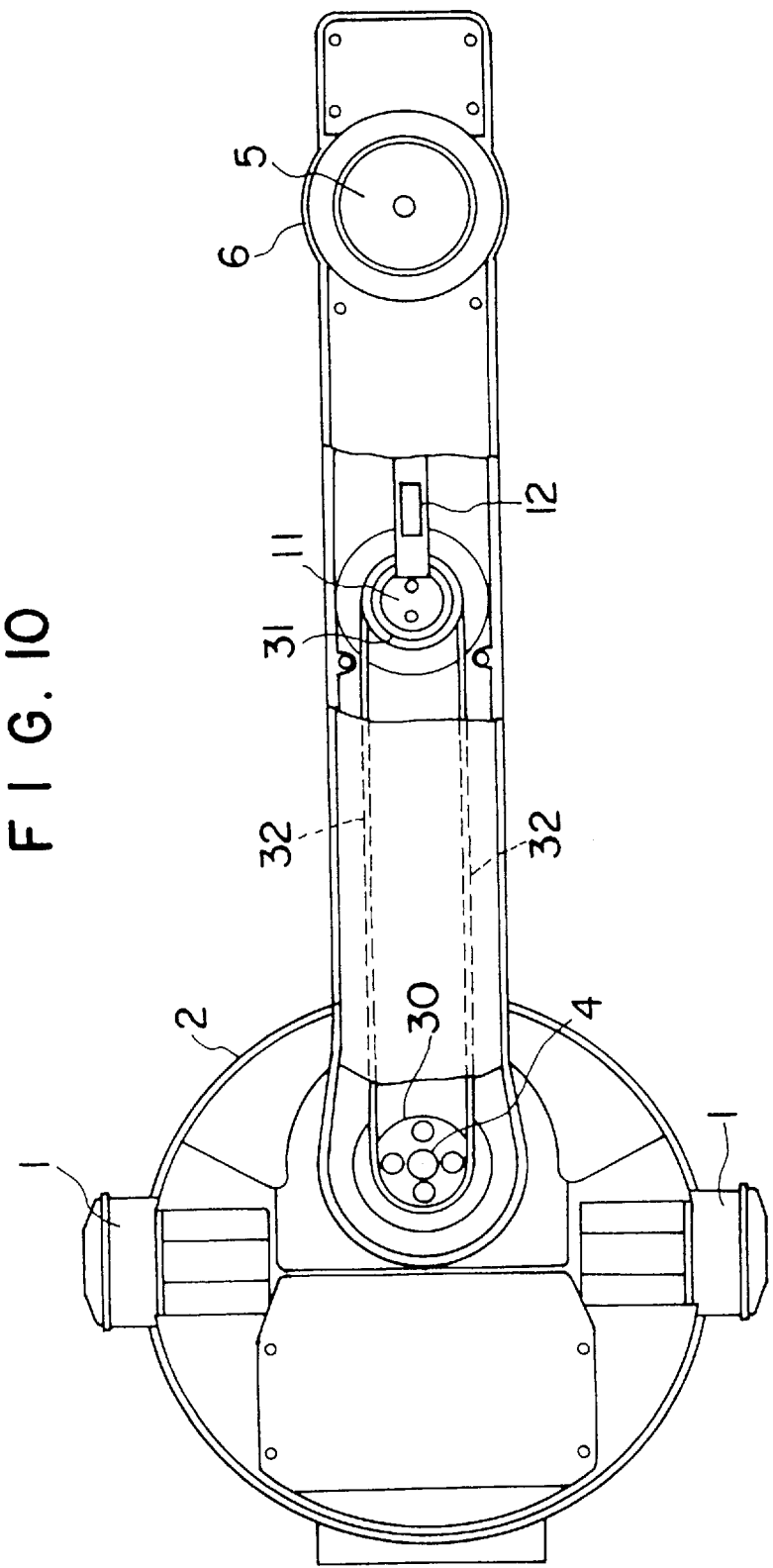

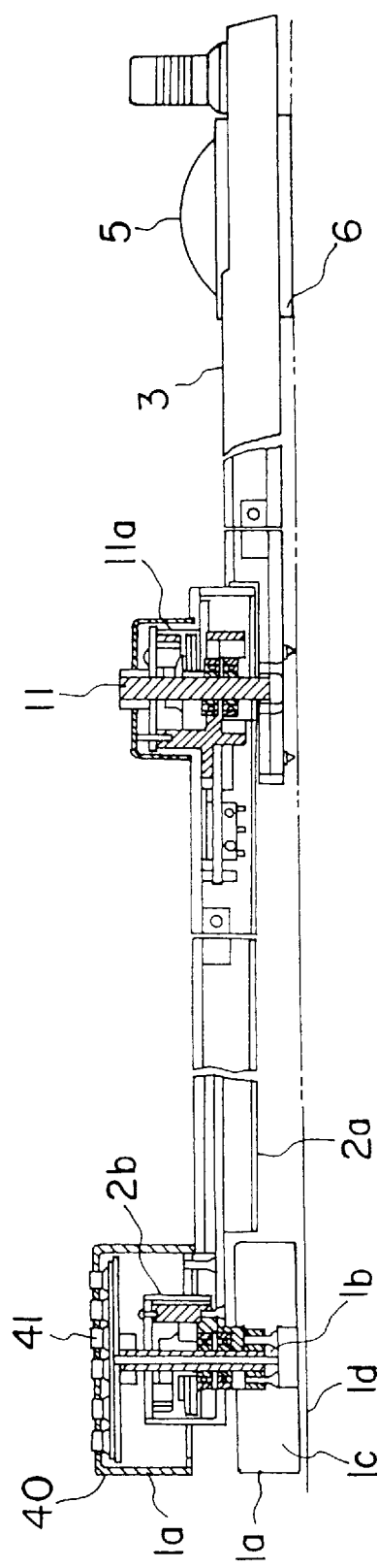

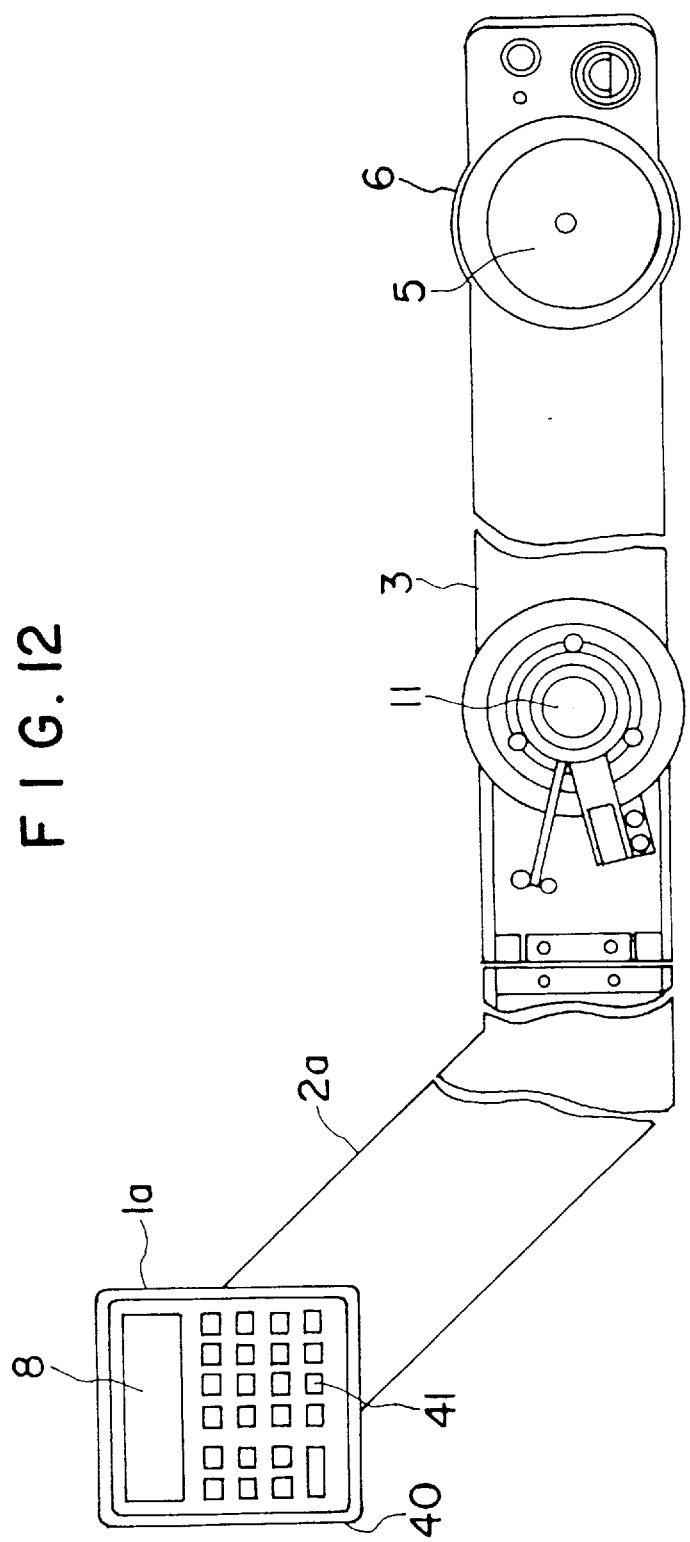

APPARATUS AND METHOD FOR MEASURING A FIGURE

BACKGROUND OF THE INVENTION

1. Field of the Invention

The present invention pertains to a device for measuring a figure, such as, for example, a linear planimeter or a polar planimeter. More particularly, the present invention is directed to a device for increasing a measurable range of a device that measures coordinates of a figure, a length of a line making up part of or extending along the figure, and similar dimensions or parameters of the figure.

2. Background and Material Information

A planimeter is a device having a tracing element or member provided at a free end of a measuring lever for tracing a figure before entering measured values into a computer in order to measure an area, a length, or coordinates of the figure. Examples of planimeters are disclosed, for example, in U.S. Pat. Nos. 4,616,419 and 5,515,299, the disclosures of which are incorporated herein in their entirety.

A measurable range of a typical measuring lever of the planimeter, obtained by turning the measuring lever, is determined by a physical length of the measuring lever of the planimeter. A measuring range of a planimeter by turning (rotating) the measuring lever is approximately 190 mm (approximately 56 degrees), from a center line in the case of a linear planimeter, or rotational range of a rotation arm pivoted on a fixed part and the measuring lever pivoted at the end of the rotation arm in the case of polar planimeter. It is inconvenient to reset the planimeter when the measuring lever is beyond the measurable range in order to measure the figure.

The inventor of the present application proposed a solution to these problems in Japanese Patent Application Number HEI 7-167606, which was filed on Jul. 3, 1995 (corresponding to U.S. patent application Ser. No. 08/671,257, filed on Jun. 26, 1996, now U.S. Pat. No. 5,727,329), the contents of which are expressly incorporated herein by reference in its entirety. According to this proposed solution, an auxiliary tracer arm is provided at the end of a measuring lever in order to increase the tracing range of the planimeter. However, while the auxiliary tracer arm reduces the severity of the problem, it does not totally eliminate the above-noted problems.

SUMMARY OF THE INVENTION

Accordingly, an object of the present invention is to provide a device for measuring (tracing) a figure that does not suffer from the above-noted problems.

According to the present invention, engaging means is provided on a part of a measuring lever through a shaft which is normally spaced apart (separated) from a drawing (figure) to be measured. Switching means are provided for switching a measurement mode of a computer (processor) associated with the measuring device to permit the shifting of the measuring device.

According to an object of the present invention, a device for measuring a figure comprises a measuring lever for tracing at least a portion of the figure to be measured, an engaging device associated with the measuring lever for selectively engaging the figure to be measured, a processor, and a controller that controls a measurement mode of the processor. The controller operates to suspend a measurement operation by the processor to allow a position of the measuring device to be shifted to another position.

According to an advantage of the present invention, the measuring device further comprises a tracer positioned proximate an end of the measuring lever, and a shaft, associated with the engaging means, that is positioned proximate a second end of the measuring lever.

Another advantage of the instant invention resides in the inclusion of a magnifying lens, such as, for example, an eccentric magnifying lens, that is associated with the tracer, for assisting in the tracing of the figure.

A feature of the instant invention resides in the controller being associated with the measuring lever. In the disclosed embodiments, the controller comprises a switch, in which a predetermined setting of the switch suspends the measurement operation. The controller further operates to continue the measurement operation after the measuring device has been shifted to the another position.

According to another object of the present invention, a device for measuring a figure comprises a measuring lever for tracing at least a portion of the figure to be measured, means for selectively engaging the figure to be measured, the engaging means being associated with the measuring lever, a processor that accumulates data associated with the measuring of the figure, and means for switching a measuring operation mode of the processor to a shifting mode so that the measuring device can be moved to a new position. The processor may function to continue to accumulate data associated with the measuring of the figure after the measuring device is moved to the new position.

The measuring device may comprise a linear planimeter, which comprises means for propelling the measuring lever in a predetermined direction, the propelling means being moved to the new position when the shifting mode is selected by the switching means. Alternatively, the measuring device may comprise a polar planimeter, which further comprises a weight for rotatably supporting a first end of a rotation arm at a fixed position, an end of the measuring lever being rotatably supported to a second end of the rotation arm, the weight being moved to the new position when the shifting mode is selected by the switching means.

According to an advantage of the instant invention, the shifting mode operates to increase a measuring range of the measuring device.

Another advantage of the present invention resides in the engaging means engaging the figure to be measured when the switching means switches the measuring operation mode of the processor to the shifting mode. The engaging means is disengaged from the figure to be measured and the processor continues to accumulate data associated with the measuring of the figure, after the measuring device is moved to the new position.

According to a feature of the present invention, the measuring device further comprises a shaft that interfaces the engaging means with the measuring lever, and a tracer that is connected to the measuring lever in axial alignment with the shaft.

An advantage of the present invention is that the measuring device may further comprise a second shaft that rotatably supports the end of the measuring lever to the second end of the rotation arm, the second shaft being in axial alignment with a shaft that interfaces the engaging means with the measuring lever.

Another object of the present invention pertains to a method for increasing a measuring range of a device that measures a figure, comprising the steps tracing at least a portion of the figure with a measuring lever, accumulating data associated with the tracing of the figure, and switching a measuring operation mode of a processor that accumulates the data to a shifting mode so that the measuring lever can be moved to a new position.

According to an advantage of the present invention, the method may further comprise the step of continuing the accumulation of data after the measuring lever has been moved to the new position.

According to another advantage of the instant invention, the method may further comprise the step of engaging the figure with the measuring lever when the switching step switches the measuring operation mode of the processor to the shifting mode.

The method of the present invention may further comprise the steps of disengaging the measuring lever from the figure after the measuring lever has been moved to the new position, and continuing the accumulation of data.

The present disclosure relates to subject matter contained in Japanese Patent Application No. HEI 7-318833 (filed on Dec. 7, 1995).

BRIEF DESCRIPTION OF THE DRAWINGS

The foregoing and other objects, features, and advantages of the present invention will be understood from the following more particular description of preferred embodiments, as illustrated in the accompanying drawings which are presented as a non-limiting example, in which reference characters refer to the same parts throughout the various views, and wherein:

FIG. 10 is a cross-sectional top view of the planimeter of the fourth embodiment of FIG. 9;

FIG. 11 illustrates a cross-sectional side view of a planimeter according to a fifth embodiment of the present invention; and FIG. 12 illustrates a plan view of a planimeter according to the fifth embodiment illustrated in FIG. 11.

DETAILED DESCRIPTION OF THE PREFERRED EMBODIMENTS

The following describes in detail various embodiments of a device for measuring a figure according to the present invention with reference to the accompanying drawings.

Figure 1A:
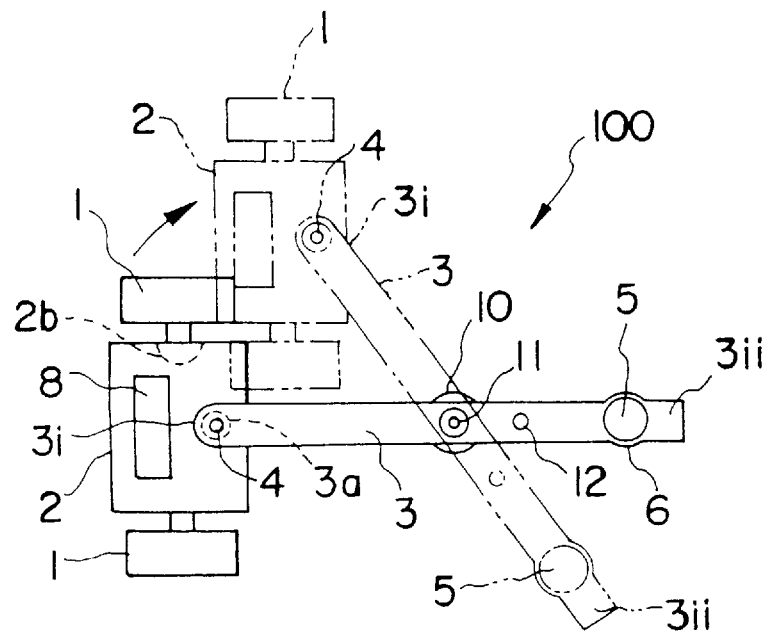
FIG. 1A is a top view illustrating a linear planimeter according to a first embodiment of the present invention.
Figure 1B:
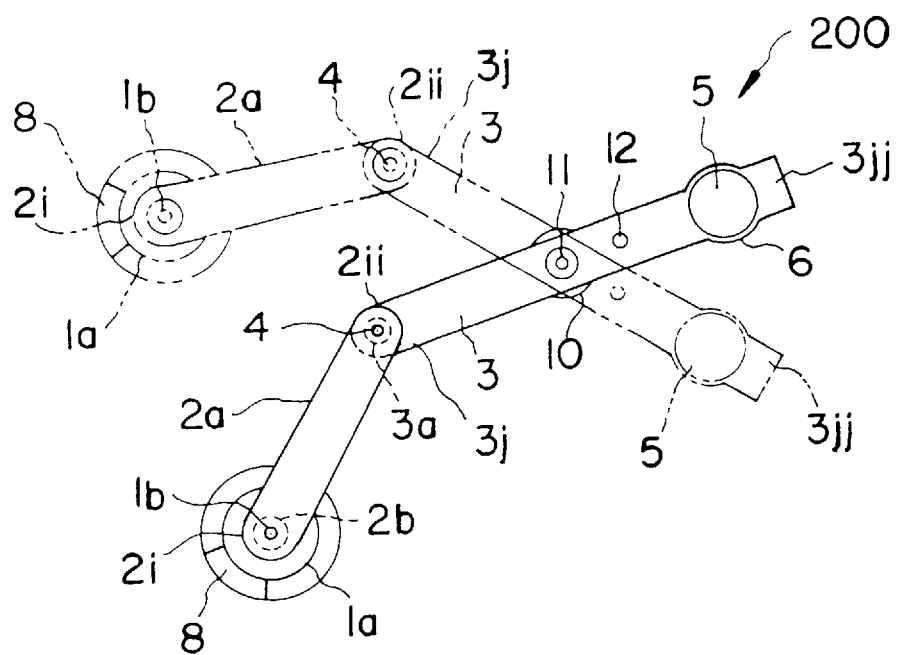
FIG. 1B is a top view illustrating a polar planimeter according to a second embodiment of the present invention.

FIG. 1A is a top view illustrating a linear planimeter according to a first embodiment of the present invention. FIG. 1B is a top view illustrating a polar planimeter according to a second embodiment of the present invention.

As shown in FIG. 1A, a linear planimeter 100 comprises a disc-like device body 2 that moves in a predetermined direction by, for example, a pair of wheels 1, such as, for example, wide-width wheels. While the preferred embodiment discloses the use of a pair of wheels, it is understood that a single wheel, more than two wheels, or even a different driving mechanism (such as, for example, a roller trackball mechanism) may be employed in place of the pair of wheels to drive (propel) the measuring device without departing from the spirit and/or scope of the present invention.

A first end $3i$ of a measuring lever 3 is rotatably supported about a vertical shaft (e.g., first pivot point) 4 on the device body 2. An eccentric magnifying lens 5, and a main tracer 6 are positioned proximate a second (far) end $3ii$ of the measuring lever 3. A digital display 8 is located on a top portion of the device body 2.

The main tracer 6 is located at the far end 3 of the measuring lever 3. The eccentric magnifying lens 5 is installed in the main tracer 6 so as to be rotatably turnable. The eccentric magnifying lens 5 assists in the tracing of the figure, as will be discussed below. The digital display 8 provides a visual indication of information, such as, for example, measured values. A rotation angle of the wheels 1 is detected by an encoder $2b$, while a rotation angle of the measuring lever 3 is detected by encoder $3a$.

As noted above, the eccentric magnifying lens 5 is used to enable one to accurately trace the figure that is being measured. Examples of an eccentric lens and its operation, as employed in a figure measuring device, are disclosed in U.S. Pat. Nos. 4,616,419 and 5,515,299. Further, while the present invention discloses the use of an eccentric magnifying lens, a conventional (e.g., non-eccentric) lens or other magnifying device may be employed without departing from the scope and/or spirit of the present invention.

FIG. 1B illustrates a polar planimeter 200. The polar planimeter 200 comprises a weight 1a that rotatably supports a first end $2i$ of a rotation arm $2a$ about a vertical shaft $1b$. A first end $3j$ of a measuring lever 3 is rotatably supported about a vertical shaft 4 proximate a second (other) end $2ii$ of the rotation arm $2a$. A main tracer 6 is attached proximate a second (far) end $3jj$ of the measuring lever 3. The main tracer 6 includes an eccentric magnifying lens 5 that is rotatably (turnably) secured thereto.

The magnifying lens 5 assists in the tracing of a figure, while the measuring lever 3 is rotatably supported about the vertical shaft 4 on the end of the rotation arm $2a$ to trace the figure.

A rotation angle of the rotation arm $2a$ is detected by encoder $2b$, while a rotation angle of the measuring lever 3 is detected by an encoder $3a$.

It is noted that a piercing needle (not illustrated) that bears (presses) against a drawing may be used instead of the weight $1a$ without departing from the spirit and/or scope of the present invention.

Figure 2:
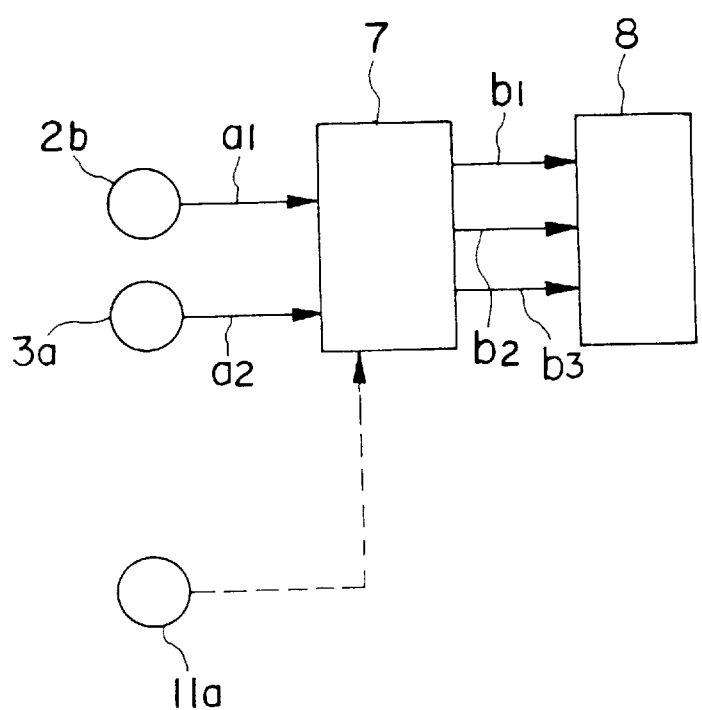
FIG. 2 illustrates, in block diagram form, a measuring circuit employed with the linear planimeter of FIG. 1A or the polar planimeter of FIG. 1B.

FIG. 2 illustrates a block diagram of a processing circuit used with the planimeters of the present invention. As shown in FIG. 2, signals a1 and a2 of encoders $2b$ and $3a$, respectively, are imputed to computer 7. Computer 7 determines a parameter of the figure, such as an area, a length, an angle, or co-ordinates of the figure being measured.

As shown in FIGS. 1A and 1B, engaging mechanism or means 10 is associated with (e.g., mounted to) a portion of the measuring lever 3 of the linear planimeter (or polar planimeter) via a shaft (e.g., second pivot point) 11. The engaging means is normally (i.e., during measurement of a figure) spaced from the drawing (figure) to be measured. The measuring lever 3 includes an operation control switch (controller) 12 for switching a measurement mode of the computer 7 to a mode in which measurement accumulations are temporarily halted, so that the planimeter can be shifted to another position while the shift distance is measured.

The operation of the measuring device will now be explained with reference to FIG. 2. Wheels 1, 1 of the first embodiment, shown in FIG. 1A (or weight 1a of the second embodiment, shown in FIG. 1B) is set to a standard (predetermined) position. Tracer 6 is then manipulated to traces a figure. Encoder 2b generates a plurality of pulse signals al in response to the rotation of the wheels 1, 1 in the first embodiment (or rotation of arm 2a in the second embodiment). Encoder 3a generates a plurality of pulse signals a2 in response to the rotation of the measuring arm 3 in both the first and second embodiments. Pulse signals a1 and a2 are imputed to the computer 7 so that an area, a length, and/or an angle of the line or co-ordinates are determined. The computer 7 produces a plurality of signals b1, b2, and b3 that are inputted to display 8, in order to provide a visual indication to an operator of the measuring device.

While the present embodiments illustrate the use of encoders that produce a plurality of pulse signals, it is understood that encoders that produce alternative signals, such as, for example, a frequency modulated signal or a signal in which a voltage level varies, may be employed without departing from the spirit and/or scope of the present invention.

Figure 3:
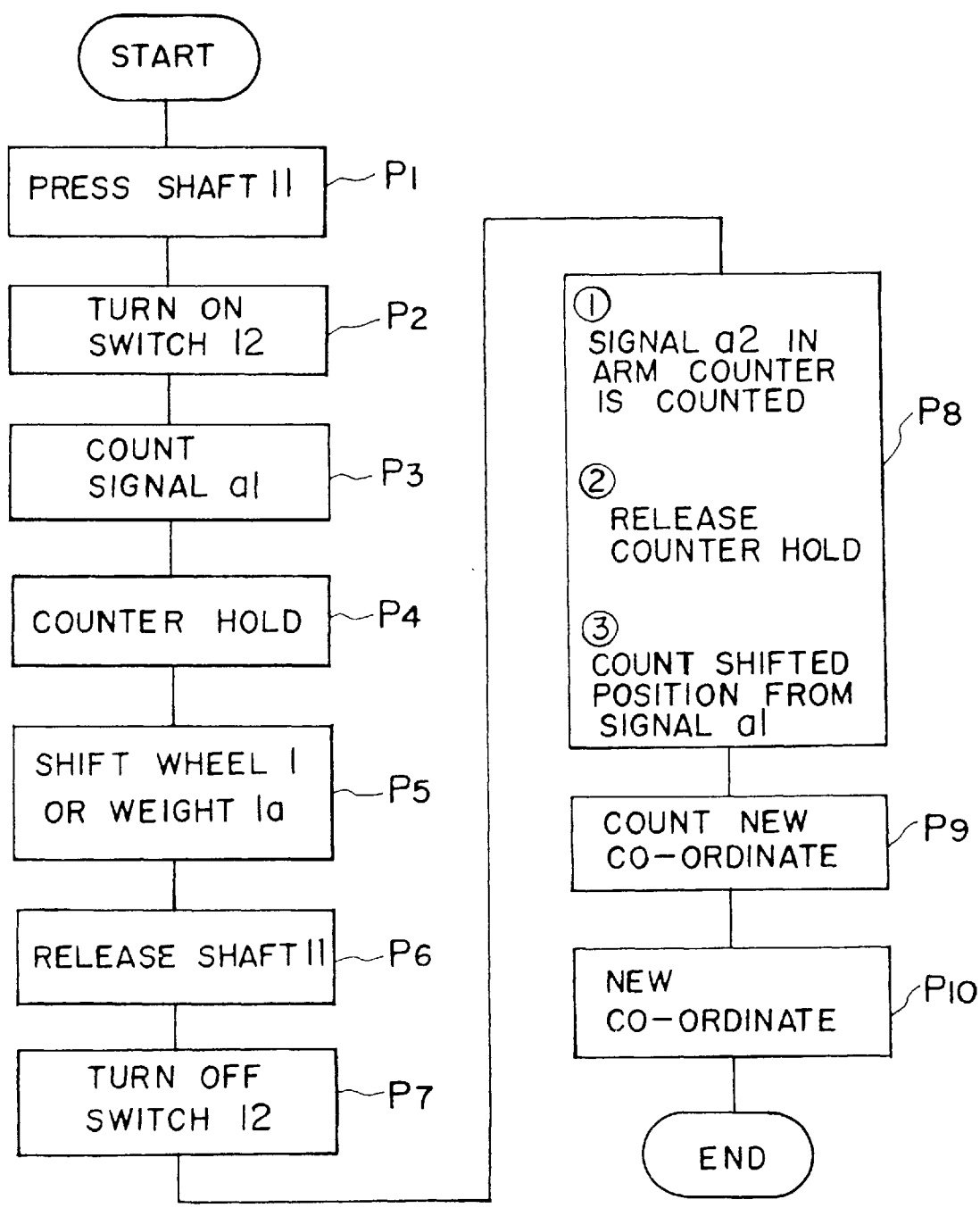
FIG. 3 illustrates a flow chart of operations performed by the measuring circuit of FIG. 2.
Figure 4:
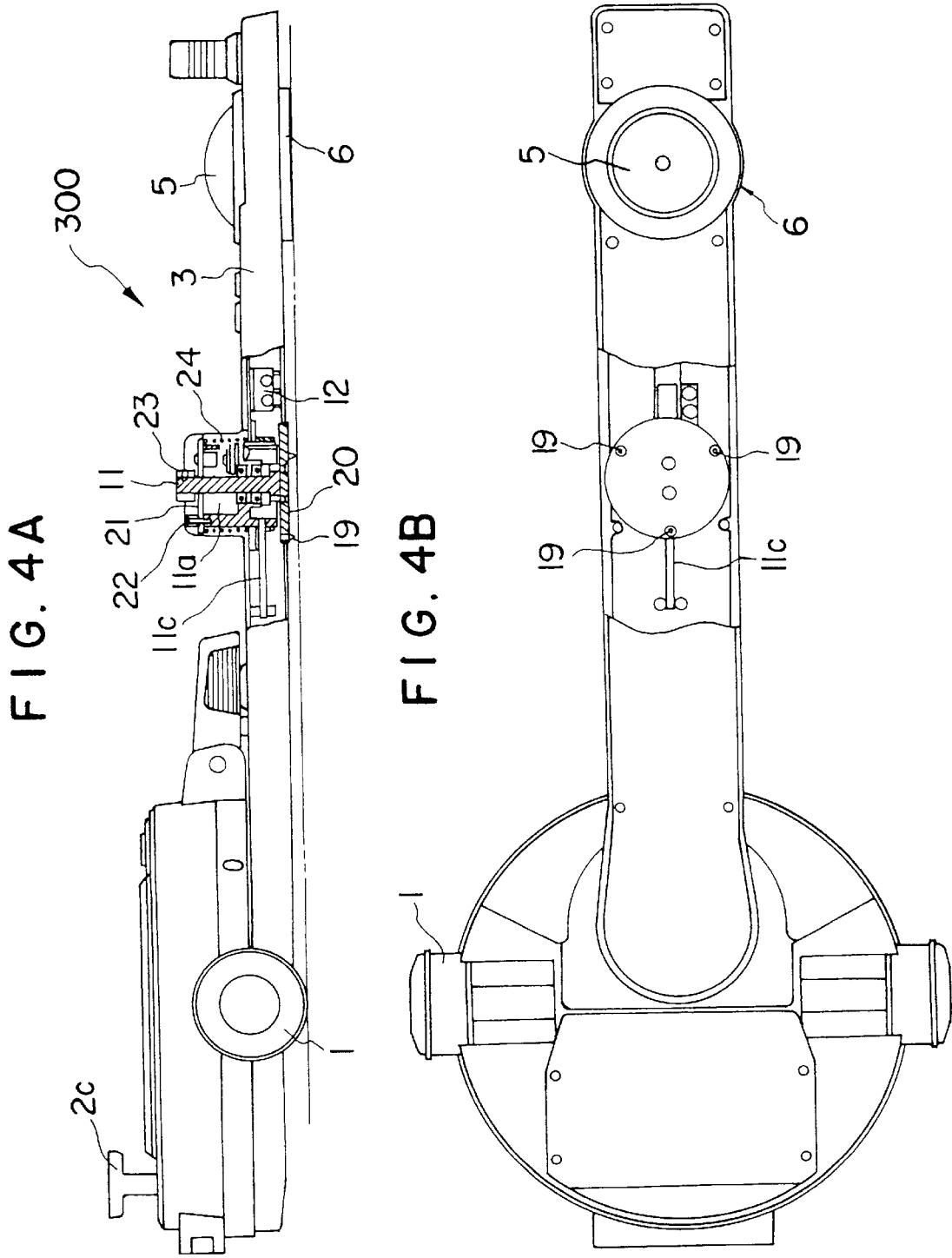
FIG. 4A is a cross-sectional side view of a linear planimeter according to a third embodiment of the present invention.
FIG. 4B illustrates a bottom view of the planimeter of FIG. 4A.

If the figure to be traced is beyond the measurable range of the planimeter, the operator actuates (e.g., depresses) shaft 11 (step P1 in FIG. 3). The engaging mechanism (device) 10 engages the figure and switch 12 is set to a predetermined setting (e.g., a shifting mode) when, for example, the switch is set to an ON (activate) setting (step P2). In the preferred embodiments, steps P1 and P2 are performed simultaneously. However, the operations represented by steps P1 and P2 may be, for example, sequentially performed without departing from the spirit and/or scope of the instant invention.

In the first embodiment (e.g., the linear planimeter), the wheels 1 can not turn left or right, but can only rotate in a forward and/or backward direction. Thus, the device body 2 can move only in a straight line direction. Encoder 2b generates signal al in response to the rotation of the wheels 1, which is accumulated in a counter associated with the computer 7 (step P3). When switch 12 is activated (turned ON) by the operator of the planimeter, the accumulated count in the counter is held (stored) at step P4. The device body 2 of the first embodiment is then shifted (moved) (or the weight 1a of the second embodiment is moved), as illustrated by the dotted line representations in FIGS. 1A and 1B, to a new standard position at step P5. Shaft 11 is then released (step P6). This results in the engaging mechanism (device) 10 being dis-engaged from the figure, and switch 12 being turned OFF (deactivated) at step P7, so that the amount of the shift can be obtained (determined) and the tracing operation can continue.

When the device body 2 is shifted from the original standard position to the new standard position, the measuring lever 3 rotates about the vertical shaft 4, Encoder 3a detects the rotation of the measuring lever 3 about the vertical shaft 4, producing signals a2 corresponding to the amount of rotation. Signal a2 is accumulated in the counter, and when switch 12 is de-activated (turned OFF), the accumulated amount is employed by the processor 7 to determine a value related to the amount of the shift. That is, prior to the restart of the tracing operation, signal a2 is accumulated in the counter, and then, the accumulated count is released and the shifted position of the planimeter is calculated (step P8). The coordinate of the shifted position is calculated at step P9 and a measurement is performed on the new coordinate (step P10), after which the shift measurement operation is completed. It is noted that the value corresponding to the shift is used with the accumulated count of signal al in order to obtain the coordinates, length and similar dimensions or parameters of the figure.

According to a variation of the instant invention (see FIG. 9), instead of restricting the device body 2 to move in a straight line direction, encoder 11a, associated with shaft 11, can be provided to detect a rotation of the shaft 11. In this case, a signal produced from encoder 11a is inputted to computer 7 in place of signal a2, as shown by the dotted line in FIG. 2.

In the case of the polar planimeter (e.g., the second embodiment), the weight 1a is physically moved in a straight line direction. Signals a1 and a2 (representing the rotation of the rotation arm 2a about the vertical shaft 1b, and the rotation of the measuring lever 3 about the vertical shaft 4, respectively) are obtained by encoders 2b and 3a, respectively, and held (accumulated) in the counter at step P4. Then, the weight 1a is shifted (moved) to a new standard position at step P5. Shaft 11 is released at step P6, which results in the turning OFF of switch 12 (step P7). Then, signals a1 and a2 are accumulated in a counter at step P8. The accumulated count is released and the position of the weight is shifted. The coordinate of the shifted position is calculated by the processor 7 to determine a value related to the amount of the shift so that the tracing operation can continue using the new coordinate (step P10). This completes the shift measurement operation.

According to a variation of the second embodiment, encoder 11a operates to detect a rotation about shaft 11, instead of restricting the weight 1a to be shifted (moved) in parallel. In this variation, the signal from the encoder 11a is imputed to computer 7 in place of signal a2, as shown by the dotted line in FIG. 2.

If the position of the shaft 11 of the engaging device 10 is the same as the position at shaft 4, it is possible to use encoder 3a instead of having to provide a separate encoder 11a.

Yet further, if the position of the shaft 11 of the engaging device 10 is the same as the position of the main tracer 6, it is possible to continuously trace the figure, even if wheels 1, 1 or weight 1a is shifted to a next standard position.

In the first and second embodiments, the shifted position of the planimeter is determined by encoders 2b and 3a in order to measure the figure. According to the above-noted variation, the shifted position is measured by encoder 11a provided on the shaft 11 of the engaging means 10.

In the first and second embodiments, switch 12 is provided on measuring lever 3. However, it is understood that the switch 12 may be provided on, for example, the device body 2 without departing from the spirit and/or scope of the instant invention.

FIGS. 4–8 illustrate a third embodiment of the present invention. Elements that are equivalent to elements of the first and second embodiments have the same numerals.

Figure 5:
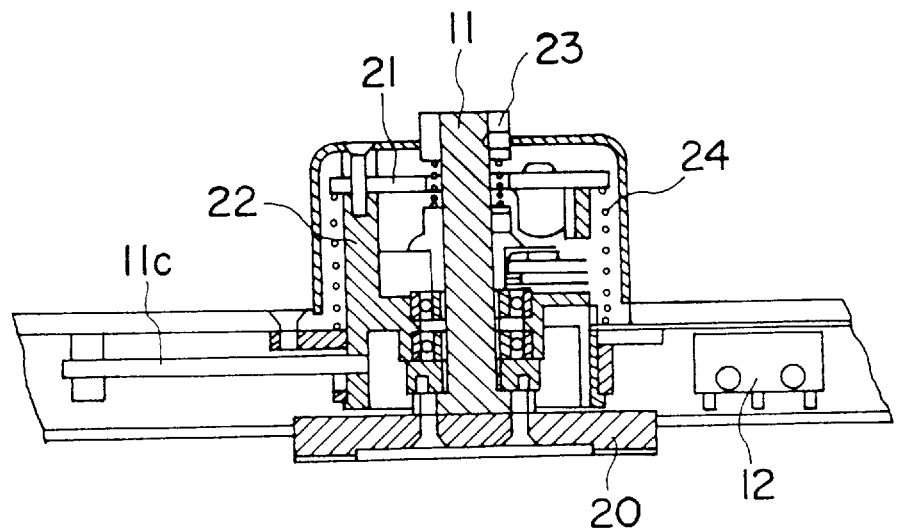
FIG. 5 is an enlarged cross sectional view of a main part of the planimeter of FIGS. 4A and 4B.
Figure 6:
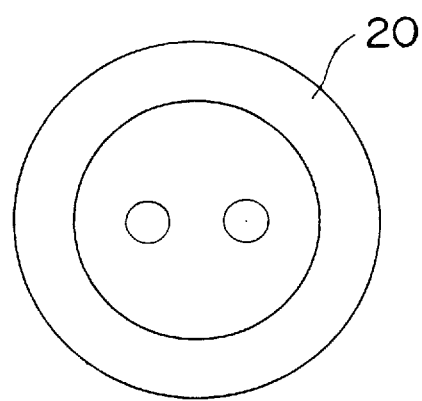
FIG. 6 is a bottom view of the main part of the planimeter of FIGS. 4A and 4B.

As shown FIGS. 4A and 4B, a planimeter 300 includes a friction plate 20, which is illustrated in greater detail in FIGS. 5 and 6. The friction plate 20 can contact the drawing (figure) and is fixed at a lower end of the shaft 11 of the engaging mechanism or means 10. Alternatively (or in addition to the friction plate 20), three needle points 19 may be provided that pierce the drawing (figure).

A flange 21 is mounted on the measuring lever 3 via pin 22, so as to be movable in an up and down (i.e., towards and away from the drawing) direction. In the preferred embodiment, a push button 23 is located at an upper end of the shaft 11, and specifically, is mounted to a center of the flange 21. A spring 24 is located between the flange 21 and measuring lever 3 so as to bias the flange 21 and shaft 11 upwardly, so that the friction plate 20 is disengaged with respect to the drawing (figure).

The encoder 11a detects a relative rotation between the measuring lever 3 and the shaft 11. A handle 2c is provided proximate an end of the device body 2 (or at any other convenient location) to facilitate the moving (shifting) of the planimeter 300.

Figure 7:
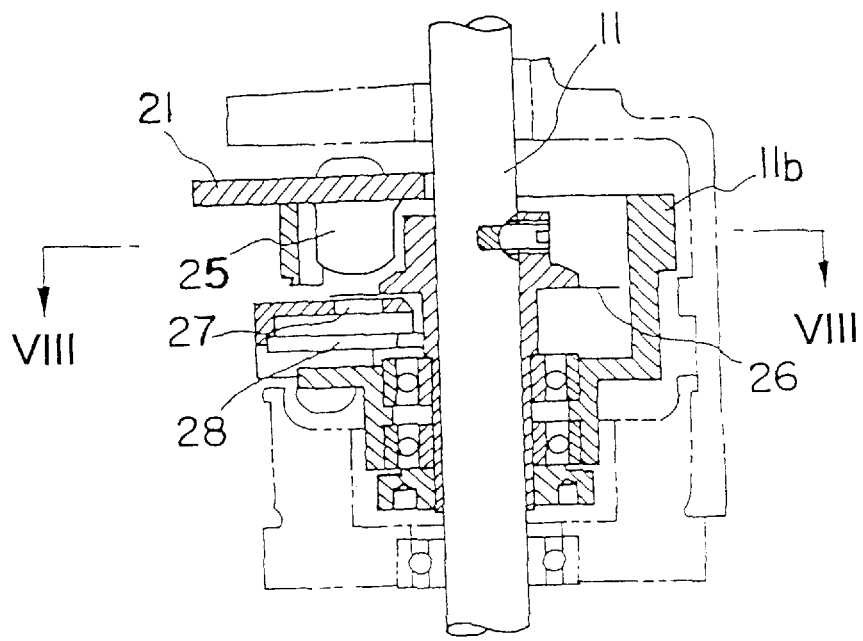
FIG. 7 is a further enlarged cross-sectional view of the main part of the planimeter of FIGS. 4A and 4B.
Figure 8:
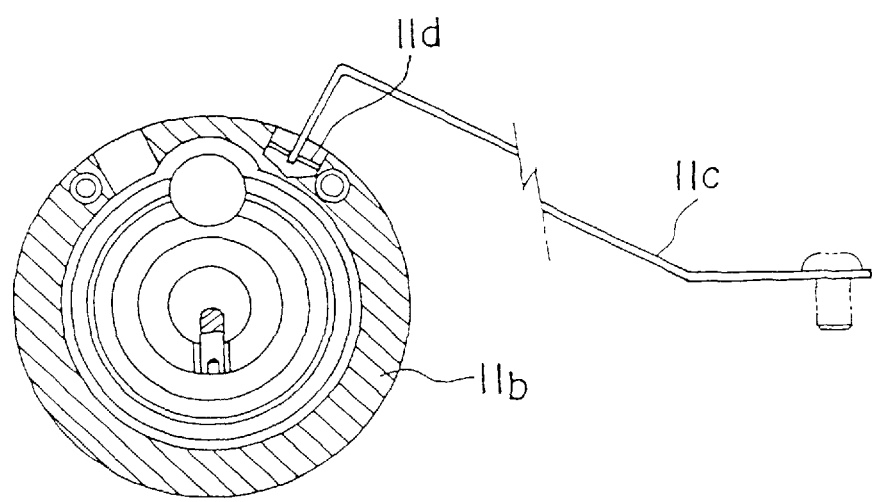
FIG. 8 illustrates a cross-section along line VIII—VIII of FIG. 7.

As shown is FIGS. 7 and 8, encoder 11a comprises a light emitting diode 25 that is fixed to the flange 21, a transparent measuring disc 26 that is fixed to the shaft 11, a transparent measuring mask 27 that is fixed to a casing 11b of the encoder 11a and which is fixed to the measuring lever 3 to prevent relative rotation therebetween, and a photo diode 28 that receives light from the light emitting diode 25.

The photo diode 28 detects interference fringes produced between the transparent measuring disc 26 and the transparent measuring mask 27 due to movement of the measuring lever 3 about the shaft 11. Casing 11b of the encoder 11a is maintained in a fixed, non-movable position by an elastic plate 11c and a rubber member 11d, as shown in FIG. 8.

In the preferred embodiment, switch 12, which functions to switch (set) the measurement mode of the computer 7, is positioned on the measuring lever 3 proximate the shaft 11. However, it is understood that the switch 12 may be located at another position, such as, for example, on the device body 2 proximate the handle 2c, without departing from the spirit and/or scope of the present invention.

The operation of the third embodiment of the present invention will be explained with respect to the flow chart of FIG. 3. When push button 23 is actuated (e.g., depressed), shaft 11 moves downwardly against the resilient force of the spring 24, so that the friction plate 20 contacts the drawing to be measured. Then, the handle 2c on the device body 2 is gripped to facilitate the movement of the device body 2 to the necessary position. The measuring lever 3 rotates about the shaft 11, resulting in the generation of a pulse signal by the encoder 11a that is in proportion to the rotated angle of the shaft 11. The pulse signal is inputted to computer 7, as shown by the dotted line in FIG. 2, so that the distance that the device body 2 is shifted (moved) can be ascertained.

It is noted that it is convenient to operate the instant device if the switch 12 is positioned on the device body 2 proximate the handle 2c to enable the switch to be actuated in relation to the grip of the handle 2c movement of the device body 2. In the third embodiment, if the device body 2 is restricted to move in a parallel direction (straight line direction) as the device body 2 is moved, the determining (counting) of a moving (shifting) distance becomes easier and encoder 11a in shaft 11 is not required.

Figure 9:
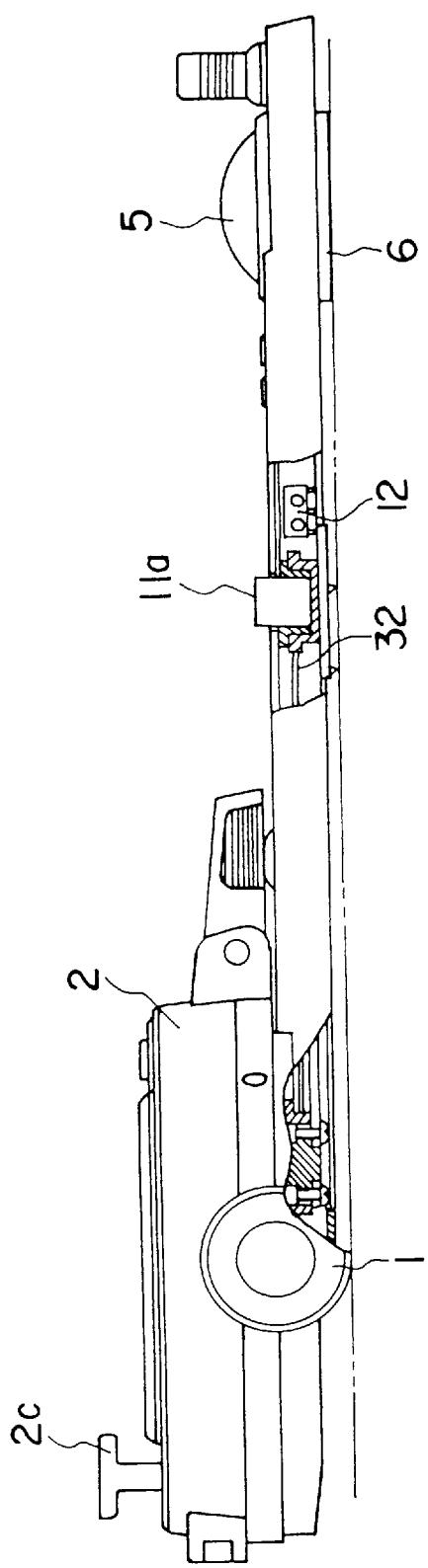
FIG. 9 is a cross-sectional side view of a planimeter according to a fourth embodiment of the present invention.

FIGS. 9 and 10 show a fourth embodiment of the present invention. Elements in common with the previously described embodiments have the same reference numerals.

In the fourth embodiment, a pulley 30 fixed to shaft 4, and pulley 31 fixed to shaft 11, are connected via a non-slip endless belt 32. Alternatively, any other motion transmission mechanism, such as, for example, a thin wire rope may be substituted for the non-slip belt without departing from the spirit and/or scope of the present invention. By this construction, the device body 2 moves in parallel, so that new coordinates X and Y, as determined in step P10 in FIG. 3, will be defined by:

$$X = L \cos Z$$

$$Y = L \sin Z$$

where "L" is the length between shafts 4 and 11, and "Z" is the rotation angle of the measuring lever 3.

FIGS. 11 and 12 illustrate a polar planimeter according to a fifth embodiment of the present invention. Elements in common with the previously described embodiments have the same reference numeral.

As shown in FIGS. 11 and 12, one end of the rotation arm 2a is rotatably supported by weight 1a for rotation about shaft 1b. One end of the measuring lever 3 is pivoted on the other end of the rotation arm 2a by vertical shaft 4 (not shown). A main tracer 6, having an eccentric magnifying lens for tracing a figure, is provided at the other end of the measuring lever 3. Encoders 3a and 2b are provided on shafts 1b. Vertical shaft 4 of the rotation arm 2a detects the rotation angle of the rotation arm 2a and measuring lever 3. Weight 1a comprises base 1c having a non-slip coating 1d provided on its bottom face. A housing 40 is provided around the weight 1a, and includes the display 8 and a keypad 41.

As explained above, an engaging means 10 is provided on a part of the measuring lever 3, via shaft 11 which is normally separated (spaced apart) from the drawing (figure) to be measured, and includes switch 12 for switching the measurement mode of the computer to measure the movement of the device (in the case of a polar planimeter) or the running position of the wheel (in the case of a linear planimeter), such that a fixed position can be shifted in order to increase the measurement range.

Although the invention has been described with reference to particular means, materials and embodiments, it is to be understood that the invention is not limited to the particulars disclosed and extends to all equivalents within the scope of the claims.

We claim:

1. A device for measuring a figure, comprising:
   a measuring lever for tracing at least a portion of the figure to be measured;
   an engaging device associated with said measuring lever for selectively engaging the figure to be measured;
   a processor; and
   a controller that controls a measurement mode of said processor, wherein said controller operates to suspend a measurement operation by said processor to allow a position of said measuring device to be shifted to another position.

2. The measuring device of claim 1, further comprising:
   a tracer positioned proximate an end of said measuring lever; and
   a shaft, associated with said engaging device, positioned proximate a second end of said measuring lever.

3. The measuring device of claim 2, further comprising a magnifying lens, associated with said tracer, for tracing said figure.

4. The measuring device of claim 1, wherein said measuring lever pivots about a first point during a tracing operation and pivots about a second point during a shift operation.

5. The measuring device of claim 1, wherein said controller is associated with said measuring lever.

6. The measuring device of claim 1, wherein said controller comprises a switch, a predetermined setting of said switch suspending said measurement operation.

7. The measuring device of claim 1, wherein said controller operates to continue said measurement operation after said measuring device has been shifted to said another position.

8. A device for measuring a figure, comprising:
   a measuring lever for tracing at least a portion of the figure to be measured;
   means for selectively engaging the figure to be measured, said engaging means being associated with said measuring lever;
   a processor that accumulates data associated with said measuring of the figure; and
   means for switching a measuring operation mode of said processor to a shifting mode so that said measuring device can be moved to a new position.

9. The measuring device of claim 8, wherein said shifting mode operates to increase a measuring range of said measuring device.

10. The measuring device of claim 8, wherein said engaging means engages the figure to be measured when said switching means switches said measuring operation mode of said processor to said shifting mode.

11. The measuring device of claim 8, wherein said processor continues to accumulate data associated with said measuring of the figure after said measuring device is moved to said new position.

12. The measuring device of claim 10, wherein said engaging means is dis-engaged from the figure to be measured and said processor continues to accumulate data associated with said measuring of the figure, after said measuring device is moved to said new position.

13. The measuring device of claim 8, wherein said measuring device comprises a linear planimeter, said linear planimeter further comprising means for propelling said measuring lever in a predetermined direction, said propelling means being moved to said new position when said shifting mode is selected by said switching means.

14. The measuring device of claim 8, wherein said measuring device comprises a polar planimeter, said polar planimeter further comprising a weight for rotatably supporting a first end of a rotation arm at a fixed position, an end of said measuring lever being rotatably supported to a second end of said rotation arm, said weight being moved to said new position when said shifting mode is selected by said switching means.

15. The measuring device of claim 8, further comprising:
   a shaft that interfaces said engaging means with said measuring lever; and
   a tracer connected to said measuring lever in axial alignment with said shaft.

16. The measuring device of claim 14, further comprising a second shaft that rotatably supports said end of said measuring lever to said second end of said rotation arm, said second shaft being in axial alignment with a shaft that interfaces said engaging means with said measuring lever.

17. A method for increasing a measuring range of a device that measures a figure, comprising the steps:
   tracing at least a portion of the figure with a measuring lever;
   accumulating data associated with the tracing of the figure; and
   switching a measuring operation mode of a processor that accumulates the data to a shifting mode so that the measuring lever can be moved to a new position.

18. The method of claim 17, further comprising the step of continuing the accumulation of data after the measuring lever has been moved to the new position.

19. The method of claim 17, further comprising the step of engaging the figure with the measuring lever when the switching step switches the measuring operation mode of the processor to the shifting mode.

20. The method of claim 19, further comprising the steps of:
   disengaging the measuring lever from the figure after the measuring lever has been moved to the new position; and
   continuing the accumulation of data.

* * * * *